US005079572A

United States Patent [19]

Shimodaira et al.

[11] Patent Number: 5,079,572

[45] Date of Patent: Jan. 7, 1992

[54] ELECTROSTATIC RECORDING HEAD AND METHOD OF MAKING THE SAME

[75] Inventors: Toshiro Shimodaira, Shiojiri; Yuki Nakamura, Ina; Toshihiro Kobayashi; Kingo Chino, both of Nagano; Takafumi Kuwazawa, Chino, all of Japan

[73] Assignee: Nippon Steel Corporation, Tokyo, Japan

[21] Appl. No.: 556,728

[22] Filed: Jul. 25, 1990

[30] Foreign Application Priority Data

Jul. 27, 1989 [JP] Japan .................................. 1-195169
Jul. 27, 1989 [JP] Japan .................................. 1-195170
Jul. 27, 1989 [JP] Japan .................................. 1-195171

[51] Int. Cl.[5] ........................ G01D 15/06; B32B 31/00
[52] U.S. Cl. ...................................... 346/155; 156/300
[58] Field of Search ......................................... 346/155

[56] References Cited

U.S. PATENT DOCUMENTS 3,808,675 5/1974 Iiyama et al. .................... 346/155 X
3,903,594 9/1975 Koneval .......................... 346/155 X
4,287,525 9/1981 Tagawa ............................... 346/155
4,539,576 9/1985 Chance et al. .................. 346/155 X
4,806,957 2/1989 Beegan ................................ 346/155
4,920,363 4/1990 Hack .................................... 346/155

*Primary Examiner*—George H. Miller, Jr.
*Attorney, Agent, or Firm*—Pollock, Vande Sande & Priddy

[57] ABSTRACT

A recording head for electrostatic recording comprises an electrode substrate formed by bonding together by a bonding agent a pair of substantially planar sub-substrates of an electrical insulating material, each of which is formed on its one surface with a plurality of elongate, equally-spaced and parallel recording electrodes electrically insulated from each other and aligned in a row, so that the electrodes on one of the sub-substrates are located, respectively, opposite to the spaces between adjacent electrodes on the other sub-substrate. In the recording head, the electrode row on each of the sub-substrates has a high degree of linearity, and the dimension in the widthwise direction of the electrode substrate defined by the distance between the electrode row on one of the sub-substrates and that on the other sub-substrate is maintained uniform over the whole longitudinal direction of the electrode substrate. A method of making such a recording head is also disclosed.

6 Claims, 6 Drawing Sheets

ELECTROSTATIC RECORDING HEAD AND METHOD OF MAKING THE SAME

BACKGROUND OF THE INVENTION

1. Field of the Invention

This invention relates to an electrostatic recording head used in an electrostatic recording apparatus and a method of making the same. More particularly, this invention relates to an electrostatic recording head having a high dimensional accuracy in the direction of the width of its electrode exposed surface as well as an excellent linearity of the electrodes in the direction of its length, and a method of making the same.

2. Description of the Related Art

An electrostatic recording head of multiple electrode type is used in an electrostatic recording apparatus in which, in response to the application of image signals from a computer, electrographics or like, an electrostatic latent image is formed at a high speed on a recording medium having a charge holding surface and an electrical conductive layer, and a toner is used to develop the electrostatic latent image into a visible image. Such an electrostatic recording head is already known from the disclosures of, for example, JP-A-53-20929, JP-A-56-110959 and JP-A-56-122056. This electrostatic recording head includes a plurality of elongate recording electrodes of an electrical conductive material disposed in parallel to each other on both surfaces of a substrate of an electrical insulating material such as a glass or an epoxy resin. When the electrostatic recording apparatus is used for electrostatic recording of an image on a recording medium, the exposed end surfaces of the electrodes of the recording head and the end surfaces of separately provided auxiliary electrodes are brought into contact with a moving recording medium, signal voltages corresponding to image signals are applied across the recording electrodes and the auxiliary electrodes to form an electrostatic latent image on the recording medium, and then this electrostatic latent image is developed by toner thereby recording a visible image on the recording medium.

The recording electrodes are provided on both surfaces of the substrate of the recording head so as to improve the recording density. However, because of the difficulty of forming many recording electrodes in an accurate positional relationship on both surfaces of a single substrate, it is a common practice that a pair of sub-substrates each having a series of equally spaced recording electrodes formed on its one surface are bonded together by a bonding agent in such a manner than the electrodes on one of the sub-substrates are located, respectively, opposite to the spaces between the adjacent electrodes on the other sub-substrate, thereby obtaining a composite electrode substrate carrying all the recording electrodes needed for the recording head.

FIG. 9 is a schematic perspective view of part of an end surface of such an electrode substrate 50 made in the manner described above. Referring to FIG. 9, the electrode substrate 50 includes a pair of sub-substrates 1 and 2 of an electrical insulator such as a glass or an epoxy resin, and a plurality of electrodes 3 of copper are formed in parallel to each other on one of the surfaces of each of the sub-substrates 1 and 2. The sub-substrates 1 and 2 are bonded together at the other or back surfaces by a bonding agent 4 to be unified into an integral structure.

The electrode substrate 50 shown in FIG. 9 is made by the steps of first depositing a thin film of copper on one surface of each of the sub-substrates 1 and 2 before being bonded, coating portions of the thin copper film corresponding to the electrodes with a photo resist according to the photolithography technique so as to cover these portions, and then etching to remove unnecessary portions of the thin copper film. The resultant sub-substrates 1 and 2 are disposed so that the electrodes on one of the sub-substrates are located, respectively, opposite to the spaces between adjacent electrodes on the other sub-substrate as shown in FIG. 9, and the sub-substrates 1 and 2 are then bonded together by the bonding agent 4 to complete the electrode substrate 50 having the recording electrodes on its both surfaces.

When electrostatic recording is to be carried out by the recording head having such an electrode substrate 50, a recording sheet A is brought into sliding contact with the end surfaces of the sub-substrates 1, 2 and electrodes 3 as shown by the broken lines in FIG. 9, applying image signal voltages across the recording electrodes 3 and associated auxiliary electrodes (not shown) located in the vicinity of the electrodes 3 thereby forming an electrostatic latent image on the recording sheet A, and then this electrostatic latent image is developed by toner thereby recording a visible image on the recording sheet A.

By providing the recording electrodes 3 on both surfaces of the electrode substrate 50 as shown in FIG. 9, the recording density can be improved. That is, after first applying signal voltages to the electrodes 3 on the sub-substrate 2, the recording sheet A is fed in the direction as shown by the arrow by a distance corresponding to the thickness of the electrode substrate 50, and signal voltages ar then applied to the electrodes 3 on the sub-substrate 1. Thus, the recording density that can be achieved is two times as high as that obtained when the electrodes 3 are formed on one surface only of the electrode substrate 50.

A dimensional error in the direction of the thickness of the electrode substrate 50 must be as small as possible. Especially, when three or four recording heads each having the electrode substrate 50 shown in FIG. 9 are arranged in parallel to each other to effect color printing, a large dimensional error in the thicknesswise direction of each of the electrode substrates 50 results in undesirable nonuniformity, blur or the like of the colors of the recorded image, and the image quality is greatly degraded.

However, in the case of the prior art electrode substrate 50, the two sub-substrates 1 and 2 are merely bonded together by the bonding agent 4. Therefore, when the electrode substrate 50 has a large length of, for example, 36 inches, it is very difficult to uniformly apply the bonding agent 4 so as to maintain the thickness of the layer of the bonding agent 4 uniform over the whole length of the sub-substrates 1 and 2 having such a large length. Thus, in the case of the prior art electrode substrate 50, the thickness of the layer of the bonding agent 4 could not be maintained uniform over the whole length, and it has been difficult to maintain the desired uniform dimension in the thicknesswise direction of the electrode substrate 50.

For the purpose of making an electrostatic recording head by the use of the electrode substrate 50 shown in FIG. 9, the electrode substrate 50 is inserted at its front end into a U-shaped groove 54 of a mold 53 as shown in FIG. 10, and a molding resin 55 is then injected into the groove 54 and cured. After taking out the molded electrode substrate 50 from the mold 53, the part providing the end surface to be brought into sliding contact with a recording sheet is polished to complete an electrostatic recording head 56 having the electrode ends 52*a* exposed at the end surface of the recording head as shown in FIG. 11.

The exposed ends 52*a* of the recording electrodes of the electrostatic recording head 56 are demanded to have a high degree of linearity over the whole length L in the longitudinal direction of the recording head 56. Especially, when three or four electrostatic recording heads 56 are arranged in parallel to each other for recording a color image as described above, not only a high degree of uniformity of the thickness in the widthwise direction of each of the electrode substrates 50 but also a high degree of linearity of the row of the exposed electrode ends 52*a* in each recording head 56 is required so as to prevent appearance of undesirable color nonuniformity or color blur on the recorded color image.

However, because the electrode substrate 50 is made by bonding together two thin sub-substrates 1 and 2 each having a thickness of, for example, 500 μm to 1 mm, wavy deformation tends to occur on the electrode substrate 50 during the molding process using a mold as shown in FIG. 10, and it is difficult to achieve the desired high degree of linearity of the row of the exposed electrode ends 52*a*.

SUMMARY OF THE INVENTION

It is a first object of the present invention to provide an electrostatic recording head in which a pair of substantially planar sub-substrates of an electrical insulating material, each of which is formed with a plurality of elongate equally-spaced parallel recording electrodes electrically insulated from each other on its one surface are bonded together by a bonding agent so that the electrodes on one of the sub-substrates are located, respectively, opposite to the spaces between adjacent electrodes on the other sub-substrate thereby forming a composite electrode substrate, in which the row of electrodes on each of the sub-substrates has a high degree of linearity, and in which the dimension in the widthwise direction of the electrode substrate defined by the distance between the row of the electrodes on one of the sub-substrates and that on the other sub-substrate is maintained uniform over the whole longitudinal direction of the electrode rows.

A second object of the present invention is to provide a method of making an electrostatic recording head as described above.

A third object of the present invention is to provide a method of making an electrostatic recording head of the kind described above, in which the electrode rows formed on the electrode substrate have an excellent linearity over the whole longitudinal direction of the electrode substrate.

According to a first aspect of the present invention, there is provided a recording head for electrostatic recording comprising an electrode substrate including a pair of sub-substrates, each of which is formed on its one surface with a plurality of elongated, equally-spaced and parallel recording electrodes electrically insulated from each other and aligned in a row, and a layer of bonding agent inserted in a spacing between said sub-substrates for bonding them together with said sub-substrates being disposed so that the recording electrodes on one of the sub-substrates are located, respectively, opposing to spaces between adjacent recording electrodes on the other sub-substrate, the bonding agent containing fillers each having a predetermined size so as to control the thickness of the layer of the bonding agent corresponding to the spacing between the sub-substrates.

According to a second aspect of the present invention, there is provided a method of making a recording head for electrostatic recording comprising the steps of preparing a pair of substantially planar sub-substrates of an electrical insulating material each of which is formed on its one surface with a plurality of elongate, equally-spaced and parallel recording electrodes electrically insulated from each other and aligned in a row; disposing the two sub-substrates so that the electrodes on one of the sub-substrates are located, respectively, opposite to the spaces between adjacent electrodes on the other sub-substrate and so that a cavity is formed between the two sub-substrates with a spacer interposed therebetween; injecting into the cavity between the sub-substrates a bonding agent containing fillers each having a size determined according to the desired spatial dimension between the sub-substrates; and curing the injected bonding agent while maintaining the spacing between the sub-substrates at the desired spatial dimension.

According to a third aspect of the present invention, there is provided a method of making a recording head for electrostatic recording comprising the steps of preparing an electrode substrate formed by bonding together by a bonding agent a pair of substantially planar sub-substrates of an electrical insulating material, each of which is formed on its one surface with a plurality of elongate, equally-spaced and parallel recording electrodes electrically insulated from each other and aligned in a row, so that the electrodes on one of the sub-substrates are located, respectively, opposite to the spaces between adjacent electrodes on the other sub-substrate; holding the electrode substrate between a pair of molds so that its longitudinal end portion closely adjacent to a line, where the electrode substrate is to be cut later to provide the end surface of the recording head to be brought into contact with a recording medium, is fixed between the molds and maintains a high degree of surface flatness and so that cavities are formed each between the remaining portion of the electrode substrate and each of the molds; injecting molding resin into the a cavities and then curing the resin; and cutting to remove unnecessary parts including the longitudinal end portion of the electrode substrate whose remaining portion is molded in the cured molding resin, thereby exposing the ends of the electrodes and providing the end surface configured to be suitable for the purpose of electrostatic recording.

DESCRIPTION OF THE PREFERRED EMBODIMENTS

An electrode substrate used to form an embodiment of the electrostatic recording head according to the present invention will now be described with reference to FIGS. 1, 2A and 2B.

Figure 1:
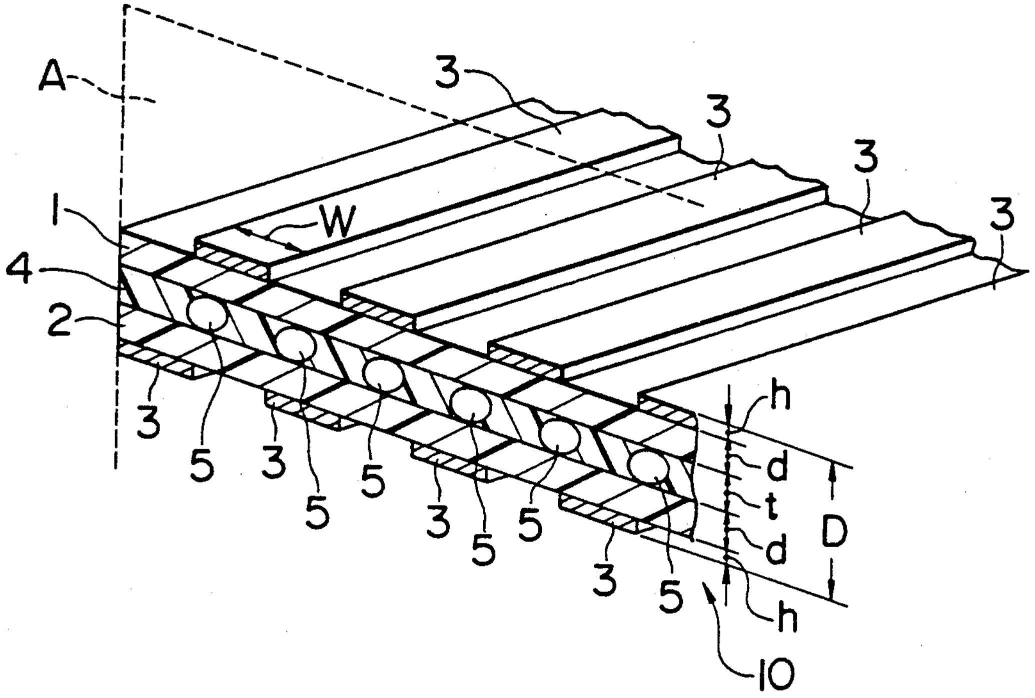
FIG. 1 is a schematic perspective view of part of an electrode substrate of an embodiment of the electrostatic recording head of the present invention, when viewed from the side of the end surface which makes sliding contact with a recording medium.
Figure 2A:
FIGS. 2A and 2B show, by way of example, different shapes respectively of fillers to be mixed in a bonding agent.
Figure 2B:
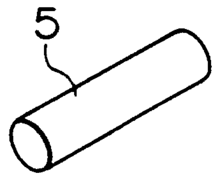

Referring to FIG. 1, an electrode substrate 10 used to make the electrostatic recording head embodying the present invention is formed by bonding together a pair of substantially planar sub-substrates 1 and 2 of an electrical insulating material by a bonding agent 4. Each of these sub-substrates 1 and 2 is formed on its one surface with a plurality of elongate, equally-spaced and parallel recording electrodes 3 electrically insulated from each other and aligned in a row. These sub-substrates 1 and 2 are bonded together in such a relation that the electrodes 3 on one of the sub-substrates 1 are located, respectively, opposite to the spaces between adjacent electrodes 3 on the other sub-substrate 2. In order to control the thickness t of the layer of the bonding agent 4 corresponding to the spacing between the sub-substrates 1 and 2, the bonding agent 4 contains fillers 5 of a hard material such as quartz ($SiO_2$) having a predetermined size. Such fillers 5 may be spherical as shown in FIG. 2A or cylindrical as shown in FIG. 2B.

The space S between the adjacent electrodes 3 is selected to be slightly larger than the width W of each electrode 3 measured in the longitudinal direction of the electrode substrate 10, and the electrode width W is determined by the desired recording density. When, for example, the desired recording density is set at 400 dots/inch, the electrode width W is about 64 μm. Also, suppose that the thickness D of the electrode substrate 10 defined by the distance between the outer surface of the electrodes 3 on the sub-substrate 1 and that of the electrodes 3 on the sub-substrate 2 is set at 2.1 mm, the thickness d of each of the sub-substrates 1 and 2 is set at 1 mm, and the thickness h of each of the electrodes 3 is set at 5 μm. In such a case, the thickness t of the layer of the bonding agent 4 is 90 μm, and the diameter of the spherical filler or the sectional diameter of the cylindrical filler 5 is (90±2) μm. The filler 5 having such a dimensional accuracy is sold on the market and easily available.

The bonding agent 4 is preferably an epoxy resin. A pre-cured bonding agent 4 containing the fillers 5 is coated on the other surface of each of the sub-substrates 1 and 2 remote from the surface on which the electrodes 3 are formed, and the sub-substrates 1 and 2 are bonded together at those surfaces to provide the electrode substrate 10 shown in FIG. 1.

Figure 3A:
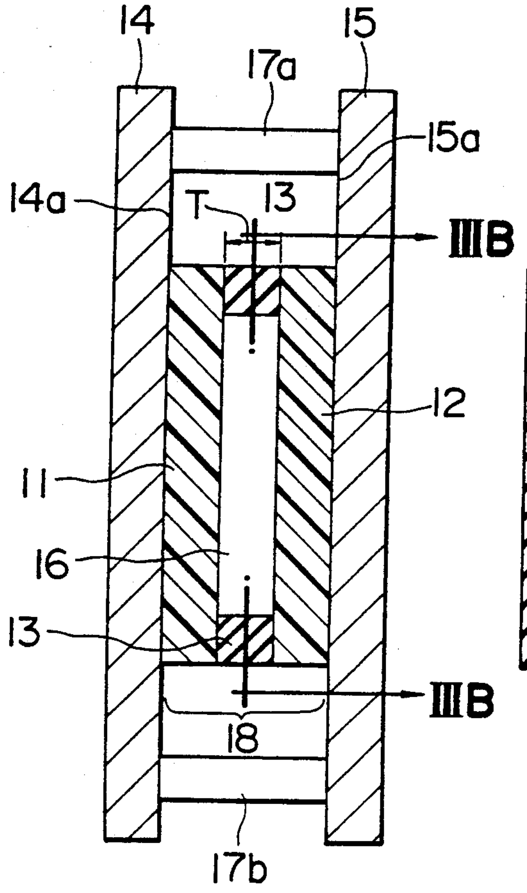
FIG. 3A schematically shows the step for making a subassembly by bonding together a pair of sub-sub-strates.
Figure 3B:
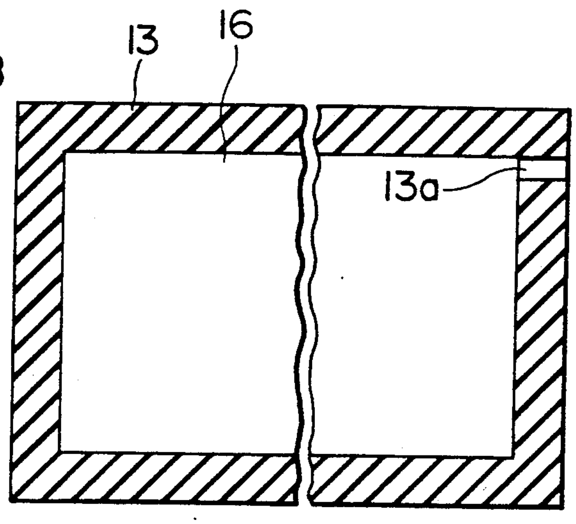
FIG. 3B is a schematic sectional view taken along the line IIIB—IIIB in FIG. 3A.

A method of obtaining an electrode substrate having a satisfactory degree of surface flatness by bonding a pair of sub-substrates each having recording electrodes formed on its one surface, will now be described with reference to FIGS. 3A and 3B. In FIG. 3A, sub-substrates 11 and 12 correspond to the respective substrates 1 and 2, shown in FIG. 1, each having electrodes 3 formed on its one surface. However, the substrates 11 and 12 shown in FIG. 3A are such that a suitable margin is added to the peripheral edges of each of the sub-substrates 1 and 2. FIG. 3*a* shows a sectional view of the sub-substrates 11 and 12 when sectioned in a direction orthogonal with respect to the direction of row of the electrodes 3, and these electrodes 3 are not shown for simplicity of illustration. The sub-substrates 11 and 12 are disposed in such a relation that their surfaces having the electrodes 3 formed thereon are located outside, and the other surfaces confront each other. The sub-substrates 11 and 12 are held by an injection molding jig in such a state that they are disposed in parallel to each other with a spacer 13 interposed between their margin portions. The injection molding jig includes a pair of flat plates 14 and 15 of a steel material having parallel surfaces 14*a* and 15*a* accurately finished to exhibit a high degree of surface flatness respectively. The flat plates 14 and 15 are arranged to be moved in directions opposite to each other by a suitable driving device (not shown) while maintaining the parallel positional relationship, so that the spacing between them is adjustable as desired. The sub-substrates 11 and 12 disposed in parallel to each other are held with their outer surfaces fixed to the inner surfaces 14*a* and 15*a* of the flat, plates 14 and 15 respectively by any suitable means. Gauges 17*a* and 17*b* act to regulate the spacing between the flat plates 14 and 15 when these plates 14 and 15 are driven by the driving device. These gauges 17*a* and 17*b* have a length equal to the width D of the electrode substrate 10 shown in FIG. 1, so that, when the flat plates 14 and 15 are driven so as to make narrow the spacing between them, the gauges are effective to regulate or limit the spacing to the value which is not smaller than the width D of the electrode substrate 10. The spacer 13 is preferably made of a relatively hard resilient material such as silicone rubber and is in the form of a rectangular frame having an opening 13*a* in part thereof as shown in FIG. 3B. Each of the sides of the spacer 13 has a rectangular sectional shape. Although the thickness T of the spacer 13 is slightly larger than the thickness t of the layer of the bonding agent 4 shown in FIG. 1 when the spacer 13 is not compressed, this thickness T becomes smaller as the spacer 13 interposed between the sub-substrates 11 and 12 is progressively compressed when these sub-substrates 11 and 12 are urged toward each other by the respective flat plates 14 and 15. Therefore, when the length of the gauges 17*a*, 17*b* and the thickness of the sub-substrates 11, 12 are accurate, the thickness of T of the compressed spacer 13 becomes equal to the thickness t of the layer of the bonding agent 4, and a cavity enclosed by the frame of the spacer 13 and having the thickness t is formed between the sub-substrates 11 and 12.

Figure 4:
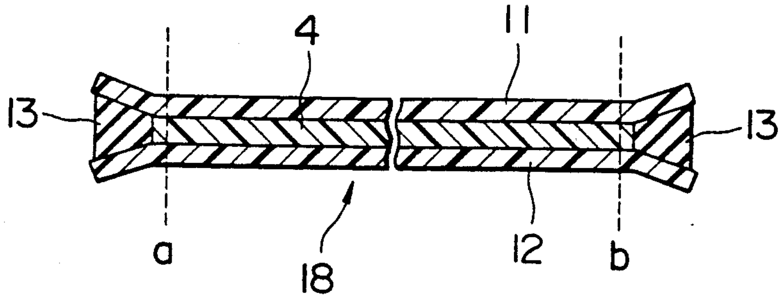
FIG. 4 schematically shows the step of fabricating the electrode substrate from the subassembly obtained by the step shown in FIG. 3A.

The pre-cured bonding agent 4 containing the fillers 5 is injected from the opening 13*a* of the spacer 13 into the cavity 16 to fill the cavity 16 enclosed by the frame of the spacer 13 in the state in which the spacing between the flat plates 14 and 15 is slightly wider than the desired thickness t of the layer of the bonding agent 4. Then, the flat plates 14 and 15 are driven to narrow the spacing between them until the spacing becomes equal to the length of the gauges 17*a* and 17*b*, thereby compressing the sub-substrates 11 and 12 from the both sides. Therefore, the spacer 13 is also compressed until its thickness T becomes equal to the thickness t of the layer of the bonding agent 4, so that the thickness t of the layer of the bonding agent 4 is made uniform throughout the whole surfaces contacting the corresponding surfaces of the sub-substrates 11 and 12 as being regulated by both the thickness of the spacer 13 and the diameter of the fillers 5. Any extra portion of the bonding agent 4 in liquid form flows out from the opening 13*a* of the spacer 13. Then, when the bonding agent 4 is heated to cure, a subassembly 18 is obtained with its margin portions having the spacer 13 sandwiched between the peripheral edges of the sub-substrates 11 and 12. When this subassembly 18 is released from the injection molding jig, the compressed spacer 13 expands, and the thickness of the margin portions increases. Then, the margin portions are removed by cutting the subassembly 18 along dotted lines a and b as shown in FIG. 4, thereby obtaining the electrode substrate 10 shown in FIG. 1.

Because the spacer 13 is made of the resilient material, the spacer 13 is compressed to produce a repulsive force when the substrates 11 and 12 are urged toward each other by the respective flat plates 14 and 15 of the injection molding jig. By this repulsive force thus produced, the sub-substrates 11 and 12 are pressed against the respective flat plates 14 and 15, thereby ensuring an intimate contact between the outer surfaces of the sub-substrates 11, 12 and the inner surfaces of the flat plates 14, 15. Thus, both the thickness uniformity and the surface flatness of the subassembly 18, especially, at the areas of the subassembly 18 adjacent to the spacer 13 can be improved. As shown in and described with reference to FIG. 4, the margin portions of the subassembly 18 are removed by cutting along the dotted lines a and b to obtain the electrode substrate 10. The electrode substrate 10 thus obtained is brought into contact with a recording medium at its electrode-end exposed surface in the vicinity of the dotted line a or b. Therefore, both the thickness uniformity and the surface flatness of the electrode-end exposed surface of the electrode substrate 10 can be improved.

However, the spacer 13 may be made of a relatively rigid material. In this case, the thickness T of the spacer 13 is selected to be equal to the thickness t of the layer of the bonding agent 4. Also, because the spacing between the flat plates 14 and 15 is regulated or limited by the thickness T of the spacer 13, the gauges 17*a* and 17*b* can be eliminated. The thickness t of the layer of the bonding agent 4 is regulated by both the thickness T of the spacer 13 and the size of the fillers 5, so that the desired thickness T can be secured.

Figure 5:
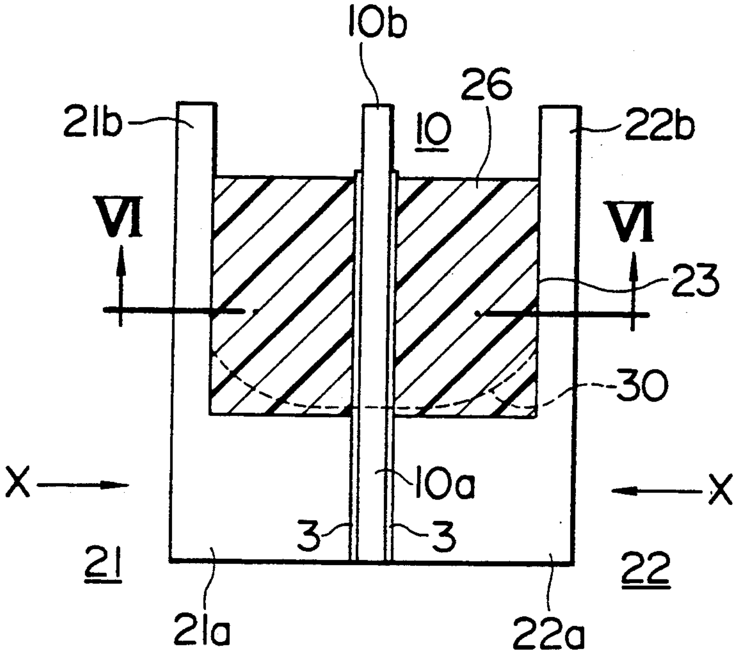
FIG. 5 schematically shows the step of making the recording head by molding the electrode substrate shown in FIG. 4.
Figure 6:
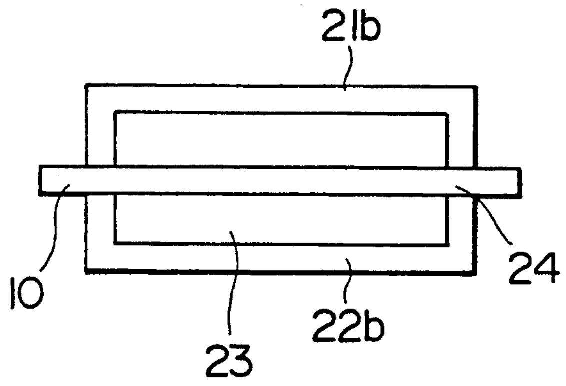
FIG. 6 is a schematic sectional view taken along the line VI—VI in FIG. 5.

An embodiment of the method of making the recording head by use of the electrode substrate 10 obtained by cutting the subassembly 18 shown in FIG. 4 will now be described with reference to FIGS. 5, 6, 7 and 8. Referring to FIG. 5, the reference numeral 10 designates the same electrode substrate as that shown in FIG. 1, and the many recording electrodes 3 extending in the vertical direction in FIG. 5 are formed on both surfaces of the electrode substrate 10. Molds 21 and 22 having bottom parts 21*a*, 22*a* and wall parts 21*b*, 22*b* respectively are used for molding the electrode substrate 10 with a molding resin. First, the molds 21 and 22 are positioned so that a portion 10*a* of the electrode substrate 10 is firmly held between the bottom parts 21*a* and 22*a*, while the remaining portion 10*b* of the electrode substrate 10 is firmly held between the wall parts 21*b* and 22*b* with its end portions extending outside of the mold through gaps 24 between the molds 21 and 22 as shown in FIG. 6. The aforementioned portion 10*a* of the electrode substrate 10 corresponds to the longitudinal end portion thereof adjacent to a cutting line 30, shown by a dotted line in FIG. 5, which is an unnecessary portion of the molded electrode substrate 10 to be cut off later so as to form the end surface which is brought, when used for recording, into contact with a recording medium. The molds 21 and 22 are arranged to be moved in directions opposite to each other by a suitable driving device (not shown) while maintaining a parallel positional relationship, so that the spacing between them is adjustable as desired. The surfaces of the bottom parts 21*a* and 22*a* of the respective molds 21 and 22 contacting the portion 10*a* of the electrode substrate 10 are accurately finished to exhibit a high degree of parallelism and surface flatness. Therefore, the portion 10*a* of the electrode substrate 10 is maintained sufficiently flat when the molds 21 and 22 are urged toward each other in the directions shown by the arrows X thereby imparting a suitable pressure to the end portion 10*a* by the bottom parts 21*a* and 22*a* of the respective molds 21 and 22. Thus, occurrence of undesirable wavy deformation on this portion 10*a* of the electrode substrate 10 and also on the adjacent portion where the electrode ends are to be exposed, can be prevented in the molding step.

Figure 7:
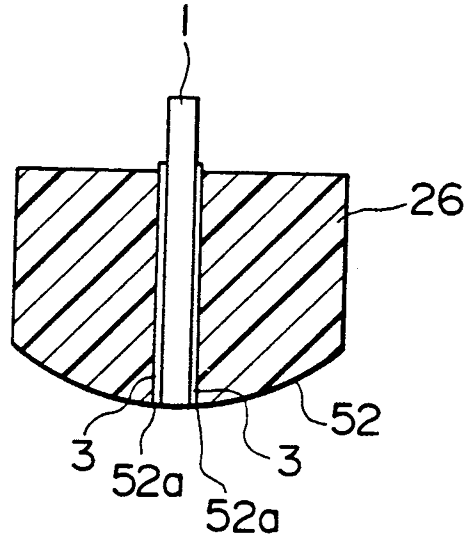
FIG. 7 is a schematic sectional view of the recording head completed by shaping the molded electrode substrate shown in FIG. 5.

Next, the molding resin is injected into cavities 233 each formed between one of the wall parts 21*b*, 22*b* of the respective molds 21, 22 and the electrode substrate 10, and the molding resin is then heated to cure, so that the electrode substrate 10 is fixed while maintaining a high degree of surface flatness at its portion 10*a* and at the adjacent portion where the electrode ends are to be exposed. After taking out the electrode substrate 10 from the molds 21 and 22, the unnecessary portions including the portion 10*a* extending along the cutting line 30 and the end portions extending outside the molds 21 and 22 through the gaps 24 are removed from the molded electrode substrate 10. The end surface of the remaining portion of the molded electrode substrate 10 is then polished to provide the recording head having the end surface 52 where the ends 52*a* of the parallel rows of the electrodes are exposed. FIG. 7 is a sectional view of the recording head, thus completed.

Figure 8:
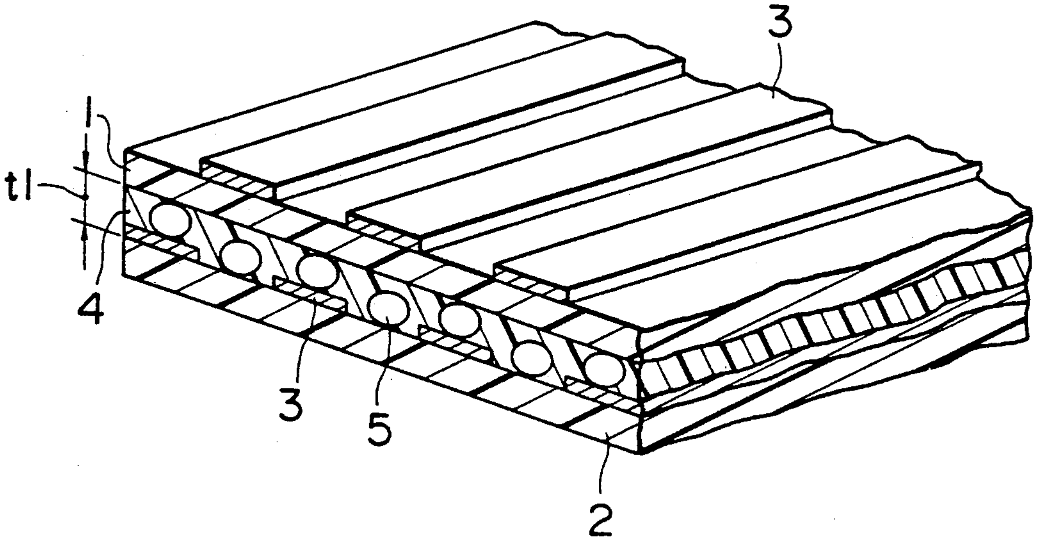
FIG. 8 is a schematic perspective view of part of an electrode substrate of another embodiment of the present invention, when viewed from the side of the end surface which makes sliding contact with a recording medium.
Figure 9:
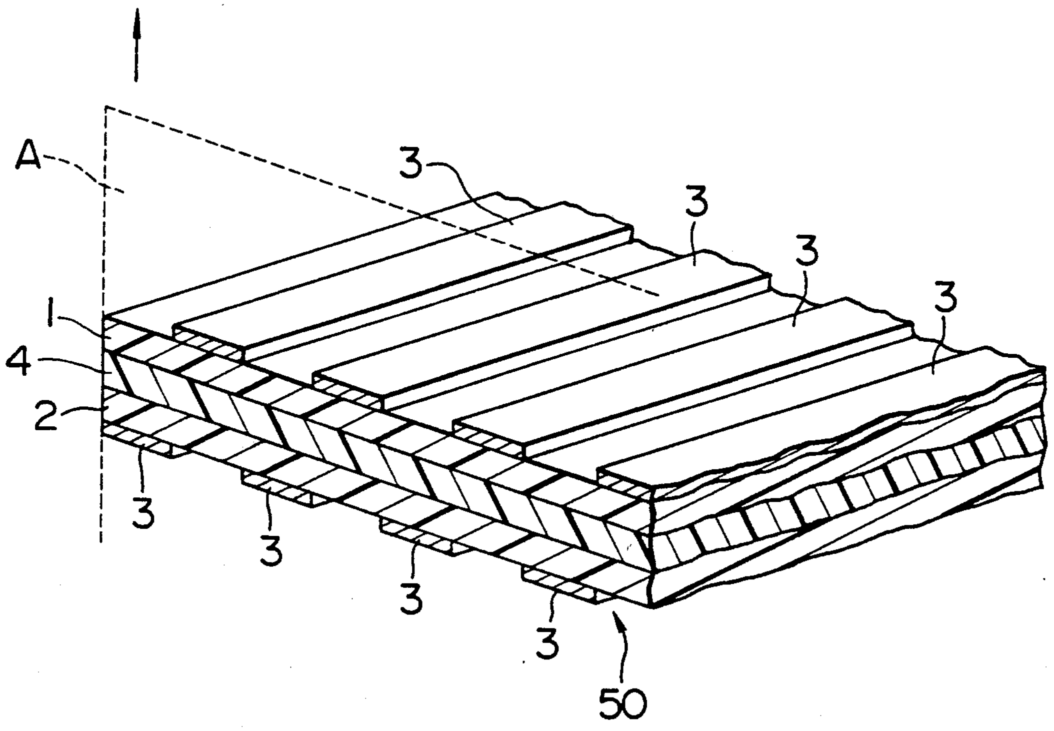
FIG. 9 PRIOR ART
FIG. 9 is a schematic perspective view of part of an electrode substrate of a prior art electrostatic recording head, when viewed from the side of the end surface which makes sliding contact with a recording medium.
Figure 10:
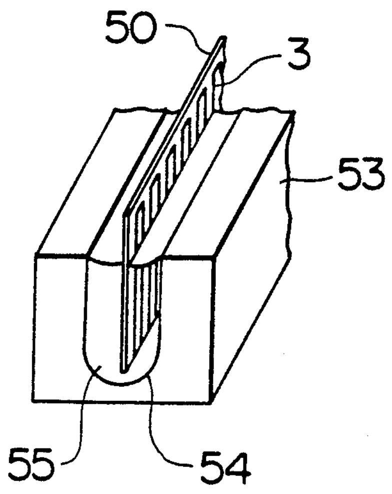
FIG. 10 PRIOR ART
FIG. 10 schematically shows the step of making the prior art recording head by molding the electrode substrate shown in FIG. 9.
Figure 11:
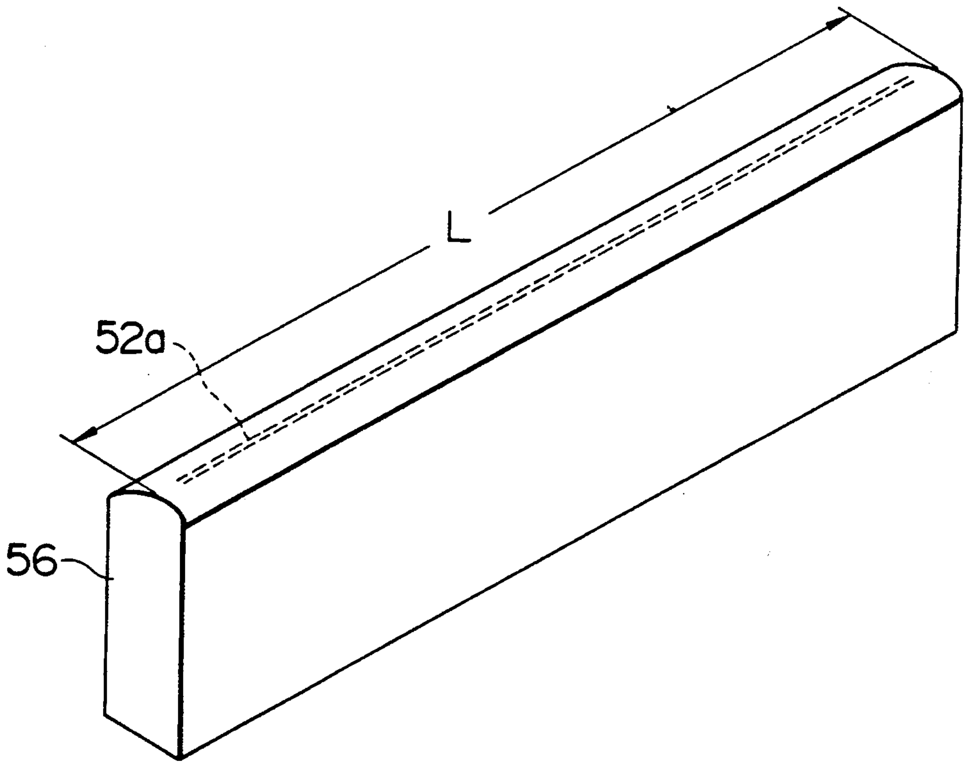
FIG. 11 PRIOR ART
FIG. 11 is a schematic perspective view showing the external appearance of the completed recording head.

In the aforementioned embodiment, a pair of sub-substrates each having a plurality of recording electrodes formed on its one surface are bonded together at their other surfaces not having the recording electrodes formed thereon, thereby providing the electrode substrate. However, as shown in FIG. 8, these sub-substrates may be bonded together such that the surface having the recording electrodes formed thereon and the surface having no recording electrodes formed thereon are facing to each other thereby forming another form of the electrode substrate. In another modification, the sub-substrates may be bonded together at their surfaces each having the recording electrodes formed thereon, thereby providing still another form of the electrode substrate. In the case of the structure shown in FIG. 8, the diameter of the spherical fillers or the diameter of the section of the cylindrical fillers is selected to be equal to the distance ti between the top surface of the recording electrodes on one of the sub-substrates and the inner surface of the other sub-substrate. On the other hand, in the case of the electrode substrate provided by bonding the sub-substrates together at the surfaces each having the recording electrodes formed thereon, the diameter of the spherical fillers or the sectional diameter of the cylindrical fillers is selected to be equal to the distance between the top surfaces of the recording electrodes on the sub-substrates. In yet another form, a thin planar sheet of insulating material may be inserted between the electrode bearing surfaces of the sub-substrates in parallel to the sub substrates, and this thin sheet may be bonded to the sub-substrates by the bonding agent containing the fillers. In this case, the size of the fillers is determined in a manner similar to that described with reference to FIG. 8.

We claim:

1. A recording head for electrostatic recording comprising:

an electrode substrate including a pair of sub-substrates, each of which is formed on its one surface with a plurality of elongated, equally-spaced and parallel recording electrodes electrically insulated from each other and aligned in a row, and a layer of bonding agent inserted in a spacing between said sub-substrates for bonding them together with said sub-substrates being disposed so that the recording electrodes on one of the sub-substrates are located, respectively, opposing to spaces between adjacent recording electrodes on the other sub-substrate, said bonding agent containing fillers each having a predetermined size so as to control a thickness of the layer of said bonding agent corresponding to the spacing between said sub-substrates.

2. An electrostatic recording head according to claim 1, wherein said sub-substrates are bonded together with their other surfaces not having said recording electrodes formed thereon being facing to each other.

3. An electrostatic recording head according to claim 2, wherein said fillers make a point contact with each of the other surface of said sub-substrates.

4. An electrostatic recording head according to claim 2, wherein said fillers make a line contact with each of the other surfaces of said sub-substrates.

5. An electrostatic recording head according to claim 1, wherein said fillers are spherical in shape.

6. An electrostatic recording head according to claim 1, wherein said fillers are cylindrical and have a circular sectional shape.

* * * * *